United States Patent
Chen et al.

(10) Patent No.: US 6,592,268 B2
(45) Date of Patent: Jul. 15, 2003

(54) CONNECTOR ASSEMBLY FLOATING MOUNT

(75) Inventors: Wenzong Chen, Naperville, IL (US); Jeffrey A. Matasek, Cedarburg, WI (US); Igor Grois, Northbrook, IL (US); Robert Razdolsky, Wheeling, IL (US)

(73) Assignee: Molex Incorporated, Lisle, IL (US)

( * ) Notice: Subject to any disclaimer, the term of this patent is extended or adjusted under 35 U.S.C. 154(b) by 145 days.

(21) Appl. No.: 09/741,528

(22) Filed: Dec. 19, 2000

(65) Prior Publication Data

US 2001/0041030 A1 Nov. 15, 2001

Related U.S. Application Data

(63) Continuation-in-part of application No. 09/568,517, filed on May 9, 2000.

(51) Int. Cl.[7] ................................................. G02B 6/36
(52) U.S. Cl. ............................ 385/88; 385/56; 385/76; 439/79; 439/248; 439/564
(58) Field of Search ............................... 385/88–94, 53, 385/56, 60, 76, 78; 439/59, 64, 76.1, 78–79, 248, 564

(56) References Cited

U.S. PATENT DOCUMENTS 5,222,168 A * 6/1993 Saito et al. .................... 385/59

* cited by examiner

Primary Examiner—Rodney Bovernick
Assistant Examiner—Sung Pak
(74) Attorney, Agent, or Firm—A. A. Tirva

(57) ABSTRACT

A system is provided for mounting a connecting device to a substrate with relative floating movement therebetween. The system includes a connector housing adapted for mounting on the substrate and including at least one elongated channel in a side of the housing. The channel extends generally perpendicular to the substrate and has an elongated restricted mouth opening at a side thereof. An elongated fastening post is snap-fit into the channel past the restricted mouth thereof to a preload position. A cross-dimension of the channel is larger than a cross-dimension of the fastening post so that the post can float relative to the housing. A fastener engages with the substrate and is operatively associated with the fastening post for tightening the post against the substrate, leaving the connector housing with floating movement relative to the substrate in a direction generally parallel to the substrate. The post may be longer than the channel to provide for floating movement of the housing relative to the substrate in a direction generally perpendicular to the substrate. In an alternative embodiment, at least a pair of connector housings are stacked on the substrate one on top of another. The elongated fastening post is long enough to snap-fit into the channels of both housings.

8 Claims, 15 Drawing Sheets

CONNECTOR ASSEMBLY FLOATING MOUNT

RELATED APPLICATION

This is a continuation-in-part of co-pending application Ser. No. 09/568,517, filed May 9, 2000, and which is assigned to the Assignee of the present application.

FIELD OF THE INVENTION

This invention generally relates to the art of connector assemblies and, particularly, to a system for mounting one or more connecting devices to a substrate with relative floating movement therebetween.

BACKGROUND OF THE INVENTION

Fiber optic connectors of a wide variety of designs have been employed to terminate optical fiber cables and to facilitate connection of the cables to other cables or other optical fiber transmission devices. A typical fiber optic connector includes a ferrule which mounts and centers an optical fiber or fibers within the connector. The ferrule may be fabricated of such material as ceramic. A ferrule holder or other housing component of the connector embraces the ferrule and may be fabricated of such material as molded plastic. A spring may be disposed within the housing or ferrule holder such that the ferrule is yieldably biased forwardly for engaging another fiber-mounting ferrule of a mating connecting device.

A pair of fiber optic connectors or a connector and another optical fiber transmission device often are mated in an adapter which centers the fibers to provide low insertion losses. The adapter couples the connectors together so that their encapsulated fibers connect end-to-end. The adapter may be an in-line component, or the adapter can be designed for mounting in an opening in a panel, backplane, circuit board or the like.

Various problems continue to be encountered in designing fiber optic connector assemblies or other connector assemblies, including applications involving backplanes, motherboards, daughterboards and the like. Such problems include properly and precisely placing a connector assembly on a substrate, such as a printed circuit board, accommodating misalignment of the connectors during mating, allowing relative floating movement between various components of the system and similar positional-type problems. Other problems simply involve efforts to simplify the design of connector assemblies. The present invention is directed to solving these problems and to providing various improvements in such connector assemblies, particularly in accommodating misalignment of the connectors during mating by providing relative floating movement of at least one of the connectors. Although the invention is shown herein embodied in a fiber optic connector assembly, the invention is equally applicable for use with other types of connector assemblies, such as electrical connector assemblies.

SUMMARY OF THE INVENTION

An object, therefore, of the invention is to provide a new and improved system for mounting a connecting device to a substrate with relative floating movement therebetween.

Another object of the invention is to provide a new and improved system for mounting a pair of connecting devices on a substrate one on top of another.

In one exemplary embodiment of the invention, the system includes a connector housing adapted for mounting on the substrate and including at least one elongated channel in the side of the housing. The channel extends generally perpendicular to the substrate and has an elongated restricted mouth opening at a side thereof. An elongated fastening post is snap-fit into the channel past the restricted mouth to a preload position. A fastener is engaged with the substrate and is operatively associated with the fastening post for tightening the post against the substrate.

As disclosed herein, a cross-dimension of the channel is larger than a cross-dimension of the fastening post so that the post can float relative to the housing. Therefore, when the post is tightened against the substrate, the connector housing is left with floating movement relative to the substrate in a direction generally parallel to the substrate. It also is contemplated that the fastening post be longer than the channel to provide for floating movement of the housing relative to the substrate in a direction generally perpendicular to the substrate.

The connector housing is adapted for mating with a complementary connecting device along an axis generally parallel to the substrate and perpendicular to the post-receiving channel. The larger cross-dimension of the channel is generally perpendicular to the mating axis whereby the housing floats in that direction. The cross-dimensions of the channel and the fastening posts are substantially equal in a direction generally parallel to the mating axis, whereby the housing is prevented from floating in that direction.

Other features of the invention include the fastening post having an internally threaded end near the substrate, and the fastener comprises an externally threaded bolt. The fastening post has enlarged heads at opposite ends thereof engageable with stop surfaces on the connector housing at opposite ends of the channel. The fastening bolt has a socket in an end thereof remote from the substrate for holding the post to facilitate tightening the post against the substrate.

In another embodiment of the invention, at least a pair of the connecting devices are stacked on the substrate one on top of another. Each connecting device includes the same connector housing. The elongated fastening post is long enough to snap into the channels in both housings. The post includes means for spacing the housings of the devices from each other.

In a third embodiment of the invention, a pair of the connecting devices again are stacked on the substrate one on top of another. The elongated fastening post comprises a first fastening post and is snap-fit into the channel in the connector housing of the bottom-most connecting device adjacent the substrate. A bridging bracket is secured to the substrate and extends over the bottom-most connecting device. A second elongated fastening post is secured to the bridging bracket and is snap-fit into a channel in the connector housing of a top-most connecting device above the bridging bracket.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

DETAILED DESCRIPTION OF THE PREFERRED EMBODIMENTS

Figure 1:
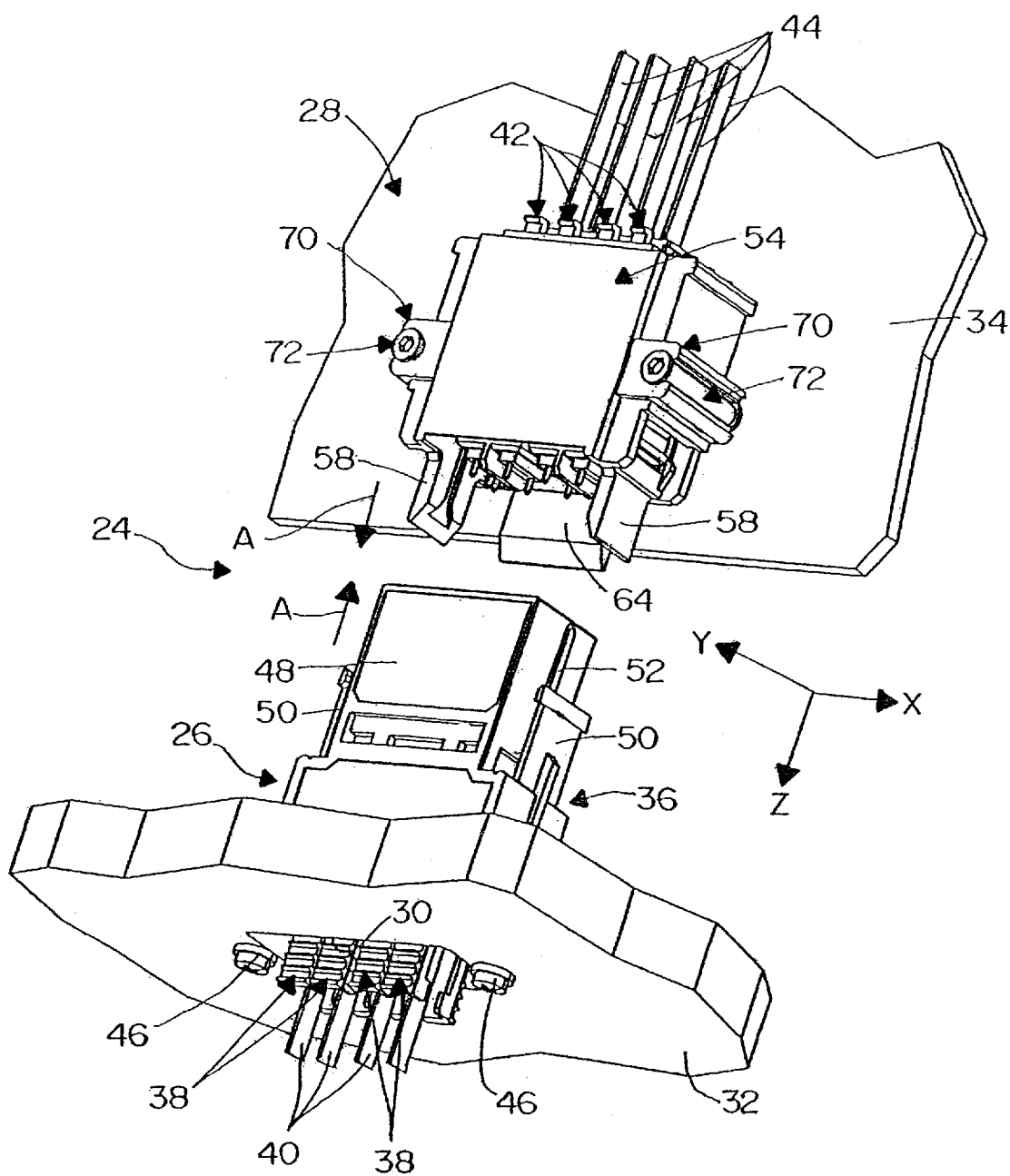
FIG. 1 is a perspective view of a first embodiment of a mating connector assembly incorporating the concepts of the invention, with the assembly in unmated condition.
Figure 2:
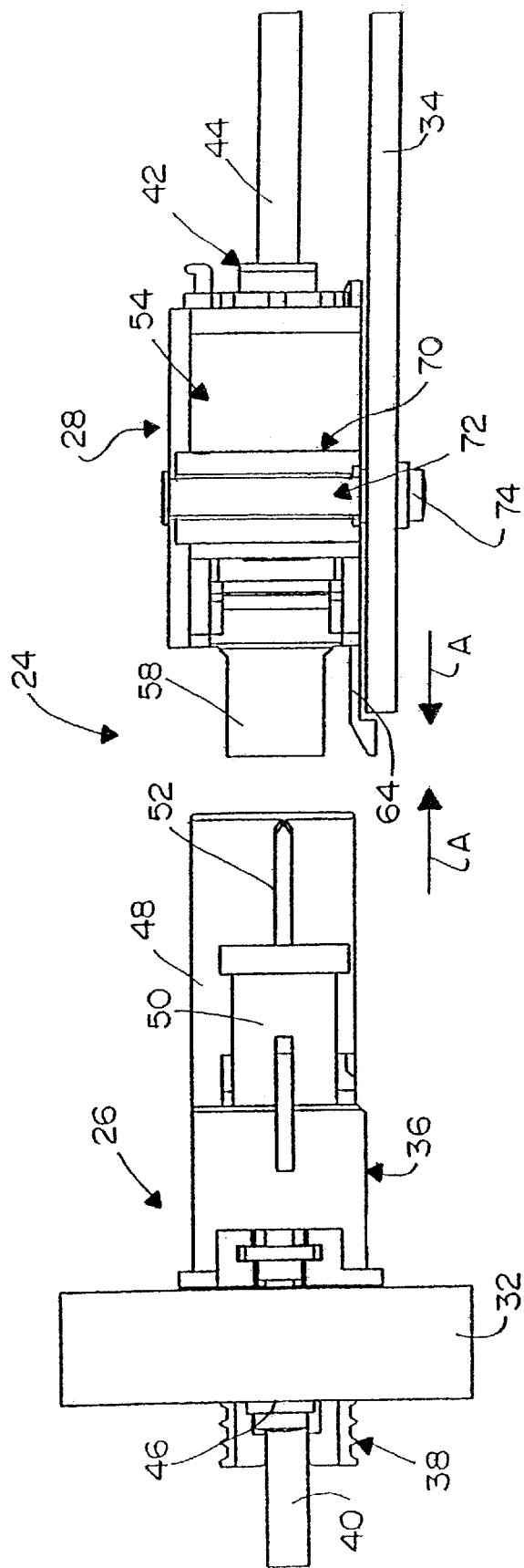
FIG. 2 is a side elevational view of the mating connector assembly as shown in FIG. 1.
Figure 3:
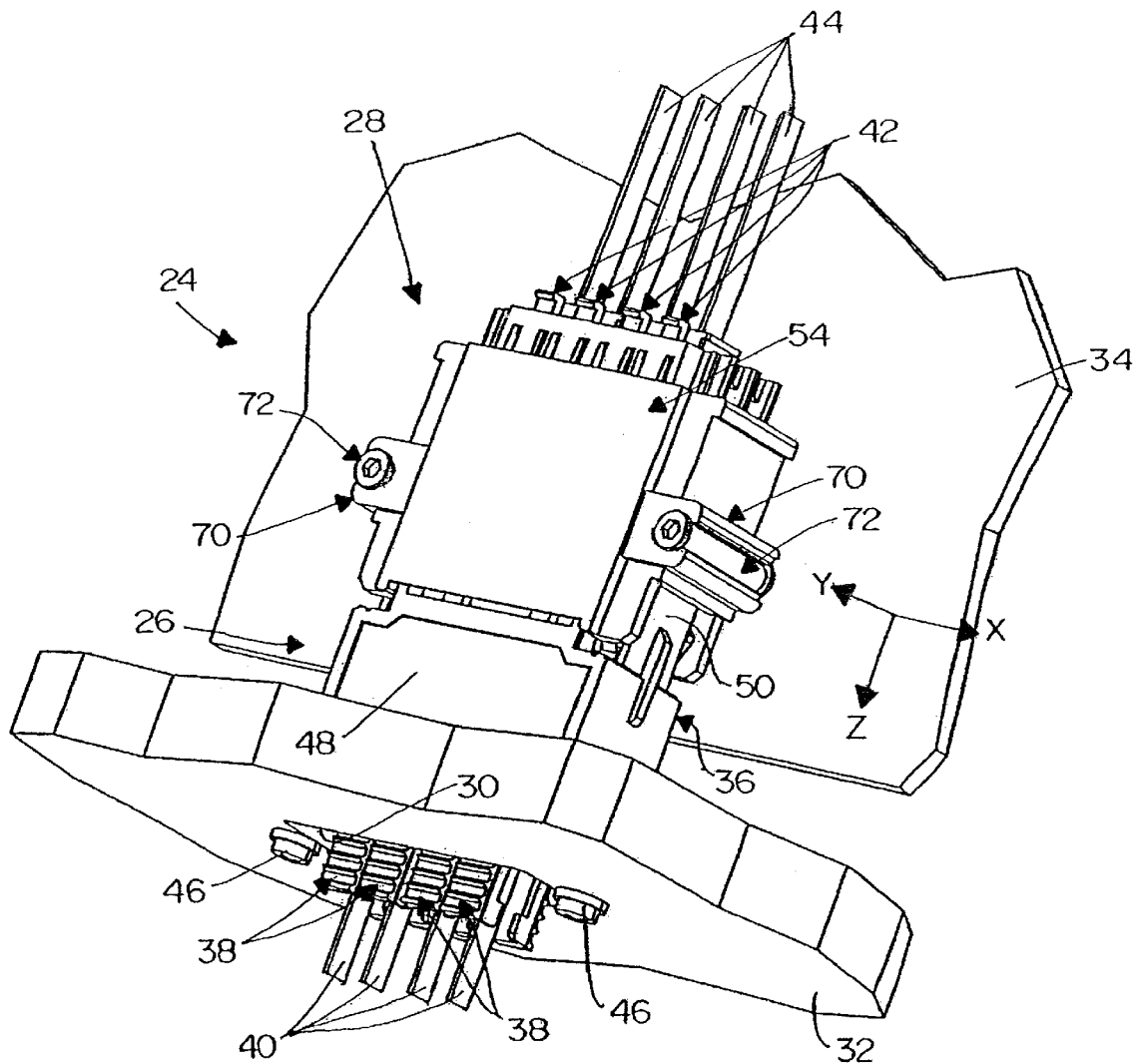
FIG. 3 is a perspective view of the mating connector assembly of FIG. 1, in mated condition.
Figure 14:
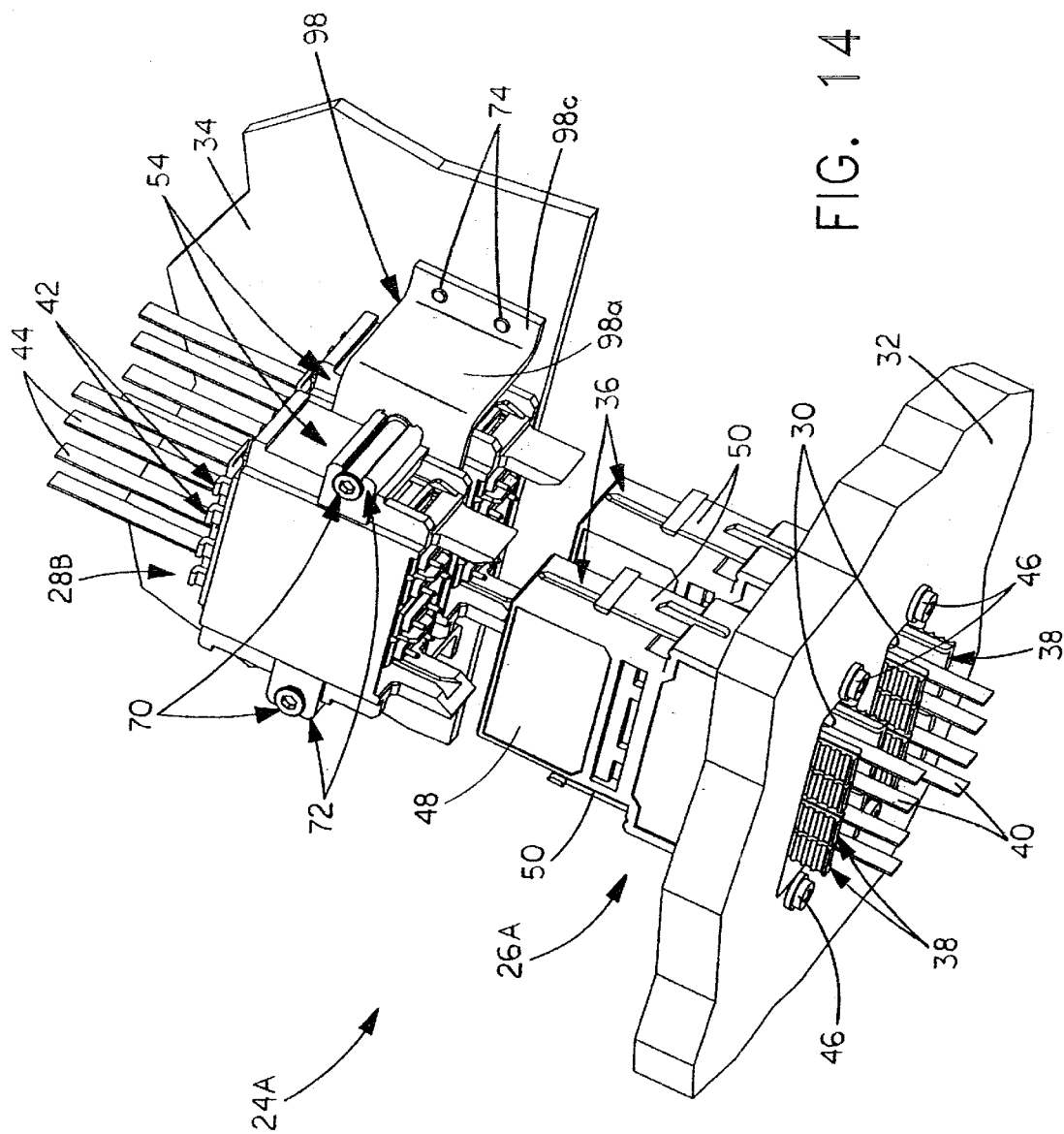
FIG. 14 is a view similar to that of FIGS. 1 and 8, but of a third embodiment of the invention.
Figure 15:
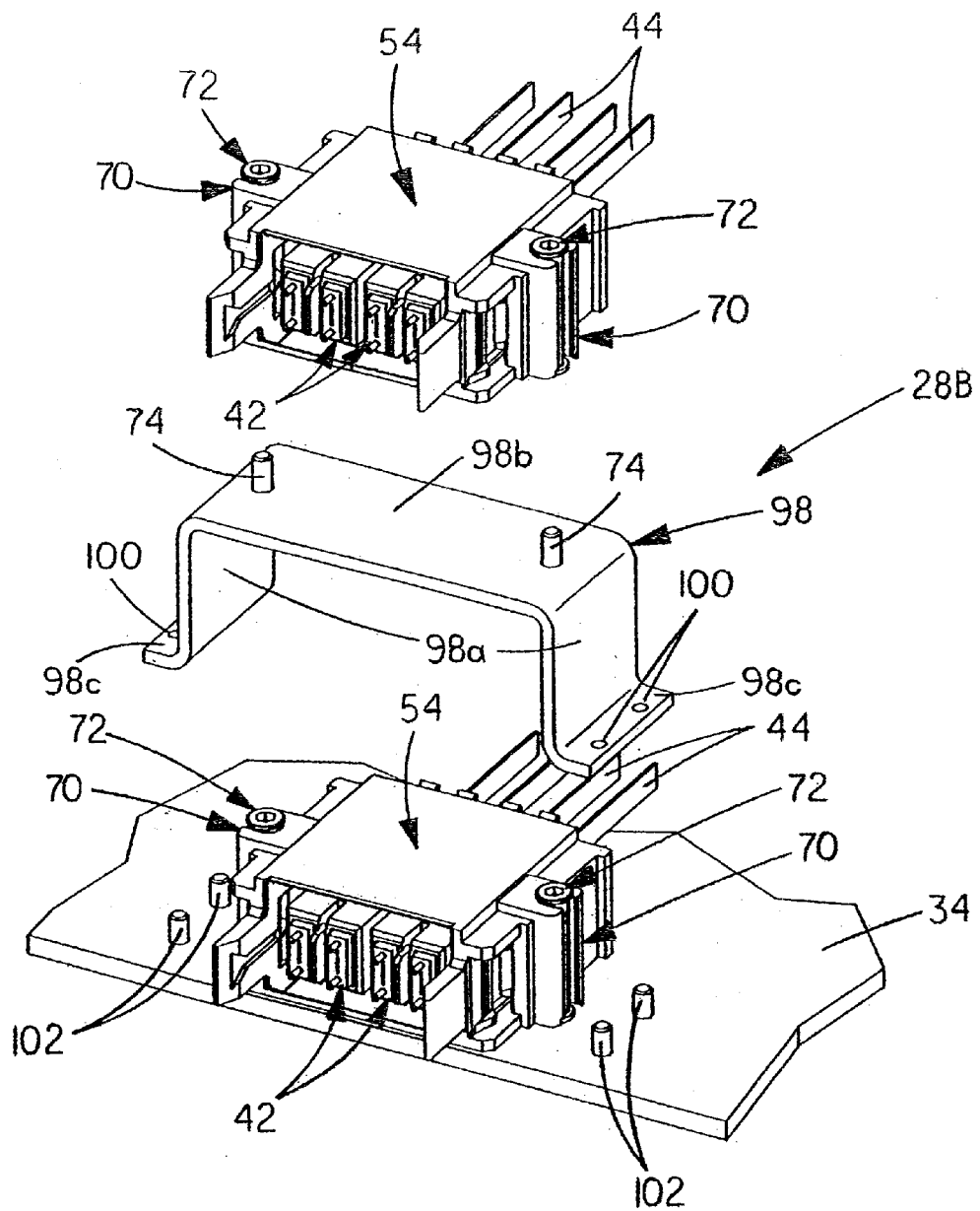
FIG. 15 is a view similar to that of FIGS. 4 and 11, but of the third embodiment of the invention.

Referring to the drawings in greater detail, FIGS. 1–7 show a first embodiment of the invention; FIGS. 8–13 show a second embodiment of the invention; and FIGS. 14 and 15 show a third embodiment of the invention. Referring first to FIGS. 1–3, the invention is incorporated in a first embodiment of a mating connector assembly, generally designated 24, which includes a backplane connector assembly, generally designated 26, mateable with a daughterboard connector assembly, generally designated 28. The backplane connector assembly is mounted in an aperture 30 in a substrate, panel or backplane 32 which, in the preferred embodiment, is a printed circuit board. Specifically, backplane 32 can be considered the "motherboard" herein. The daughterboard connector assembly is mounted on a top surface of a second printed circuit board 34 which is considered the "daughterboard" herein.

Backplane connector assembly 26 includes an adapter, generally designated 36, which is mounted in aperture 30 in motherboard 32. Four fiber optic connector modules, generally designated 38, are inserted into adapter 36, through aperture 30, from the front of backplane 32. Each fiber optic connector module is terminated to a multi-fiber cable 40. Each cable is a flat or "ribbon" cable having a plurality of optical fibers.

After daughterboard connector assembly 28 is mounted on daughterboard 34, four fiber optic connector modules, generally designated 42, are inserted into the back of the connector housing, as described hereinafter. Each module 42 is terminated to a flat, multi-fiber cable 44 similar to fiber optic cables 40. Backplane connector assembly 26 and daughterboard connector assembly 28 are mateable in the direction of arrows "A" (FIGS. 1 and 2) to a mated condition shown in FIG. 3, wherein the fibers of cables 40 and 44 are functionally connected.

Adapter 36 of the backplane connector assembly is fixed to backplane 32 by a pair of fasteners 46. The adapter includes a housing 48 and a pair of flexible latch arms 50 spaced outwardly from opposite sides of the housing. The housing also has a pair of outwardly projecting alignment ribs 52 on opposite sides thereof.

At this point, reference is made to FIG. 1 where three intersecting arrows "X", "Y" and "Z" are shown. Arrow "X" represents a direction generally parallel to daughterboard 34. Arrow "Y" represents a direction generally perpendicular to the daughterboard. Arrow "Z" represents a direction generally parallel to the daughterboard but corresponding to the mating direction of the connector assemblies as described above by arrows "A". In other words, direction "X" is transversely of the mating direction of the connector assemblies.

Figure 4:
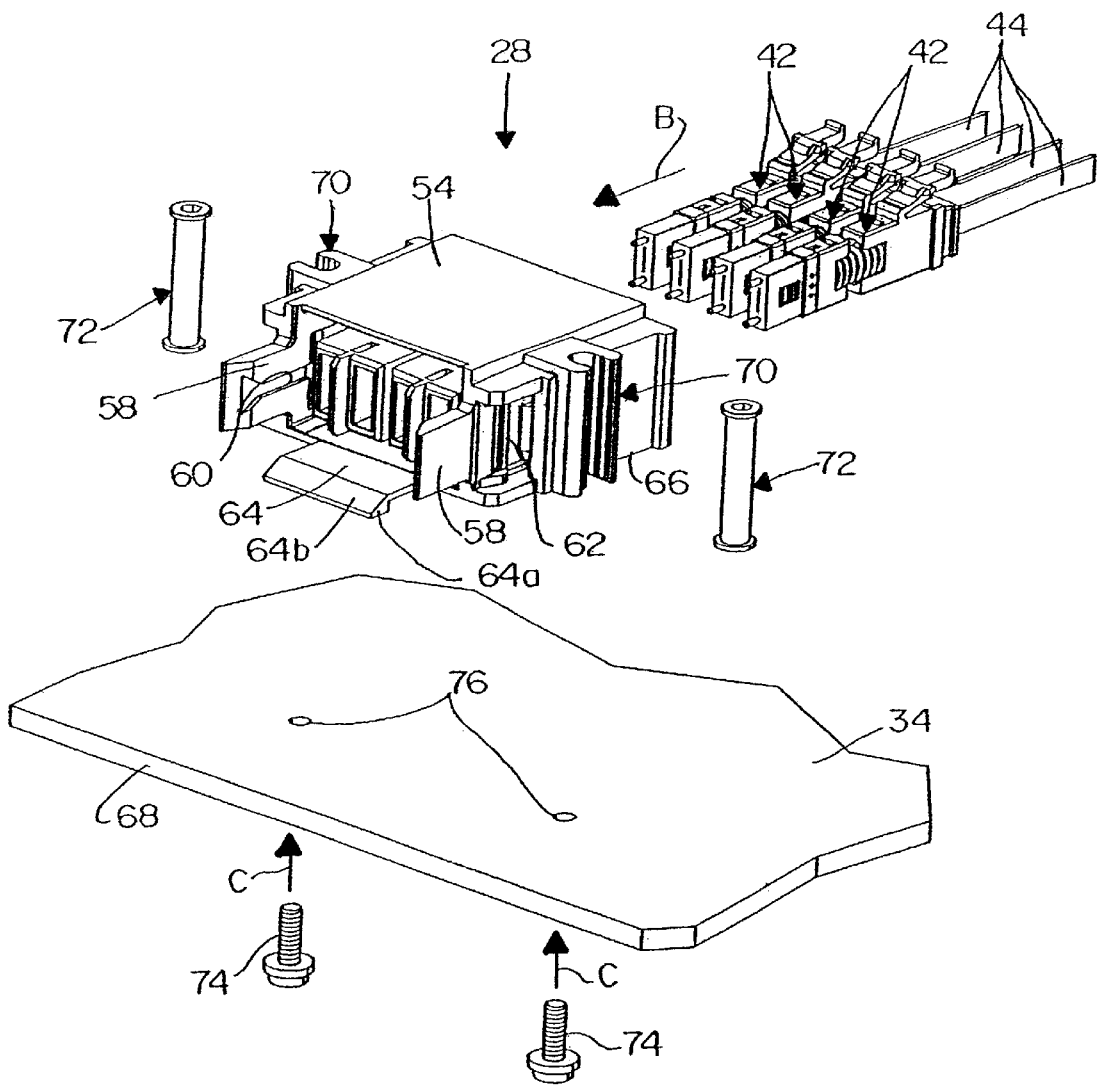
FIG. 4 is an exploded perspective view of the daughterboard connector assembly as seen to the right in FIGS. 1 and 2.

FIG. 4 shows daughterboard connector assembly 28 to include a connector housing, generally designated 54, adapted for mounting on top of daughterboard 34. The housing is molded of dielectric material such as plastic or the like and includes four through passages or receptacles 56 for receiving fiber optic connector modules 42 in the direction of arrow "B". The housing has a pair of forwardly projecting alignment flanges 58 at opposite sides thereof and between which housing 48 (FIG. 1) of adapter 36 is inserted. Alignment ribs 52 on opposite sides of the adapter housing ride into grooves 60 on the insides of alignment flanges 88. A pair of latch ribs 62 also are provided on opposite sides of housing 54 for engagement by latch arms 50 of adapter 36. A bottom flange 64 projects forwardly of housing 54 flush with a bottom surface 66 of the housing. The flange has a bottom hook portion 64a and a top chamfered portion 64b. The bottom hook portion overlaps an edge 68 of daughterboard 34. The top chamfered portion is engageable by the front bottom edge of adapter housing 48 to prevent the bottom edge of the adapter housing from "stubbing" the front edge of the daughterboard during mating of the connector assemblies.

The invention contemplates that connector housing 54 of daughterboard connector assembly 28 includes elongated channels, generally designated 70, on opposite sides thereof for receiving a pair of elongated fastening posts, generally designated 72. As will be described in greater detail hereinafter, the fastening posts are snap-fit into the channels to preload positions so that they can be transported and manipulated as a subassembly with housing 54. A pair of fasteners in the form of externally threaded bolts 74 are inserted from the bottom of daughterboard 34 in the direction of arrows "C", through holes 76 in the daughterboard, and into the bottoms of fastening posts 72, as will be seen in greater detail hereinafter. The bolts tighten fastening posts 72 to daughterboard 34, leaving connector housing 54 (i.e., daughterboard connector assembly 28) with floating movement relative to the daughterboard, all of which will be seen hereinafter.

Figure 5B:
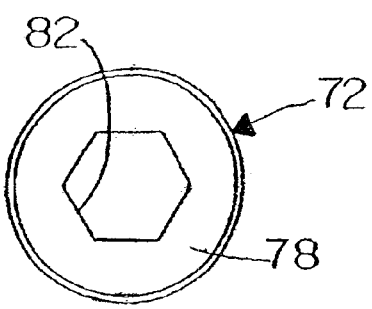
FIGS. 5A–5C are a side elevational view, top plan view and axial sectional view, respectively, of one of the elongated fastening posts.
Figure 5C:
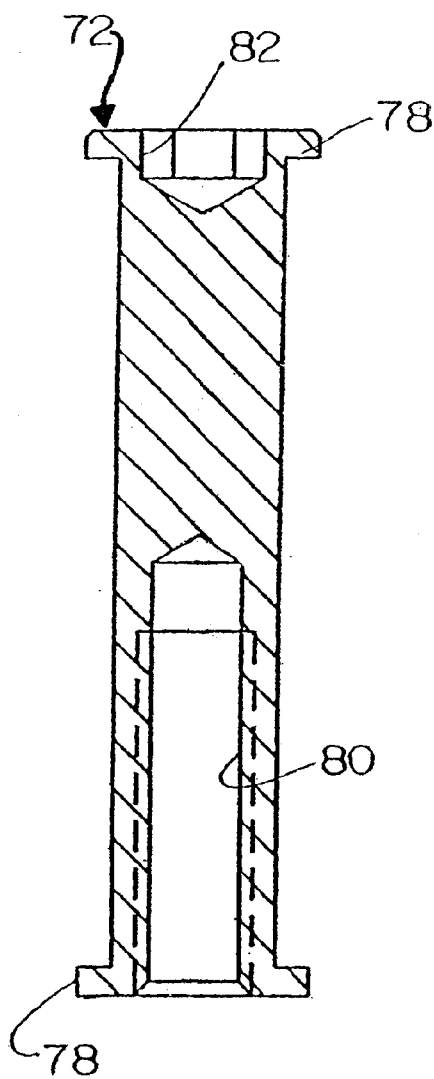
Figure 5A:
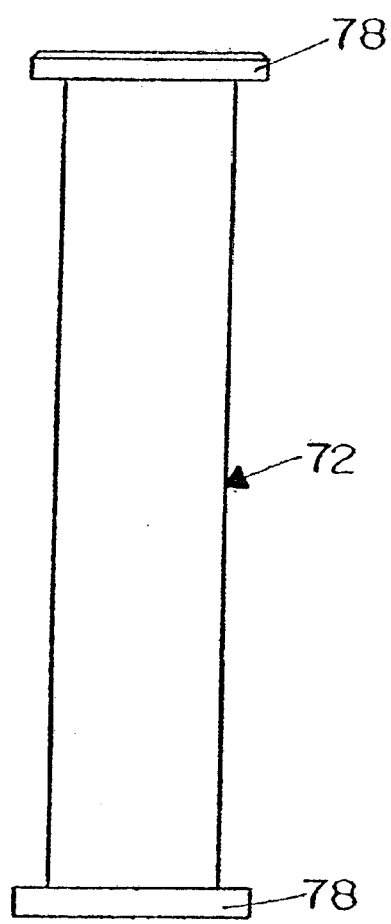

FIGS. 5A–5C show that each fastening post 72 is elongated, generally cylindrical and includes a pair of enlarged heads 78 at opposite ends thereof. The bottom of each fastening post is internally threaded, as at 80, for receiving a respective one of the bolts 74 to tighten the fastening post onto the top of daughterboard 34. The top of each fastening post includes a hexagonal socket 82 for receiving a wrench to prevent rotation of the fastening post while the bolt is threaded thereinto or to disassemble the assembly from the daughterboard if necessary.

Figure 6:
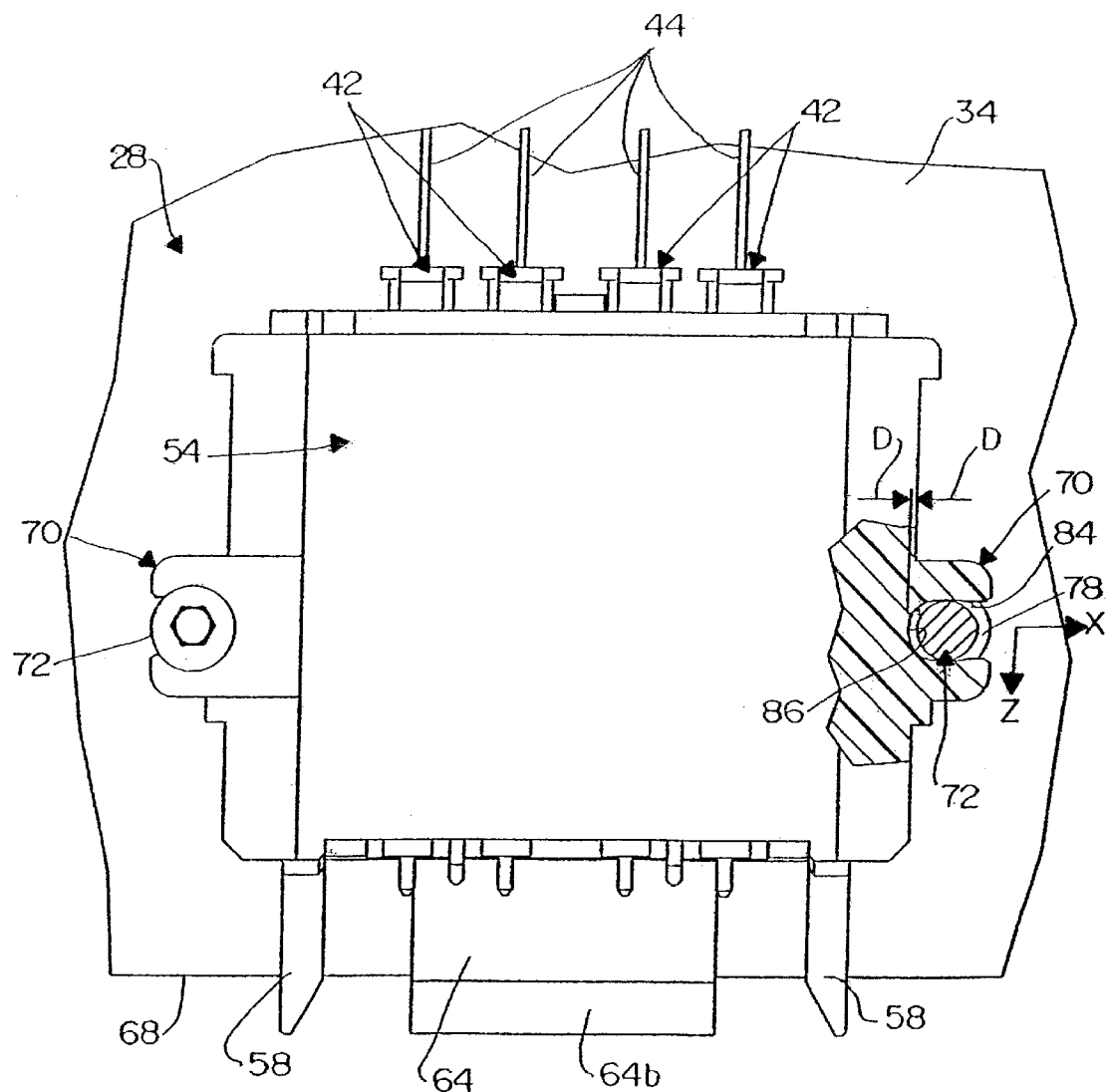
FIG. 6 is a top plan view of the daughterboard connector assembly, partially broken away to show the amount of floating between the connector assembly and the substrate generally parallel to the substrate.

Generally, FIG. 6 shows how fastening posts 72 within channels 70 provide for floating movement of connector housing 54 and, therefore, daughterboard connector assembly 28, relative to daughterboard 34 in the "X" direction described above, i.e., generally parallel to daughterboard 34 and generally perpendicular to the mating direction "Z" of the connector assemblies. First of all, FIG. 6 shows that each channel 70 has a restricted mouth 84 which is slightly narrower than the diameter of the respective fastening post 72 between heads 78 thereof. Therefore, the fastening posts can be snap-fit into the channels, past the restricted mouths 84 of the channels, to a preload position to facilitate handling and manipulation of the connector assembly without the fastening posts falling away therefrom.

FIG. 6 shows that each fastening post 72 has a cross-dimension substantially equal to the cross-dimension of the interior of channel 70 in the "Z" direction. This prevents any floating movement of the housing relative to the daughterboard in the "Z" or mating direction of the connector assemblies. On the other hand, the cross-dimension of the interior of each channel 70, i.e., between restricted mouth 84 and a base or bottom 86 of the channel, is larger than the cross-dimension of the fastening post. This differential in the dimensions is shown by arrows "D". This differential allows for floating movement of housing 54 and daughterboard connector assembly 28 relative to daughterboard 34 in the direction of arrow "X", i.e., generally parallel to the daughterboard and generally perpendicular to the mating direction of the connector assemblies.

Figure 7:
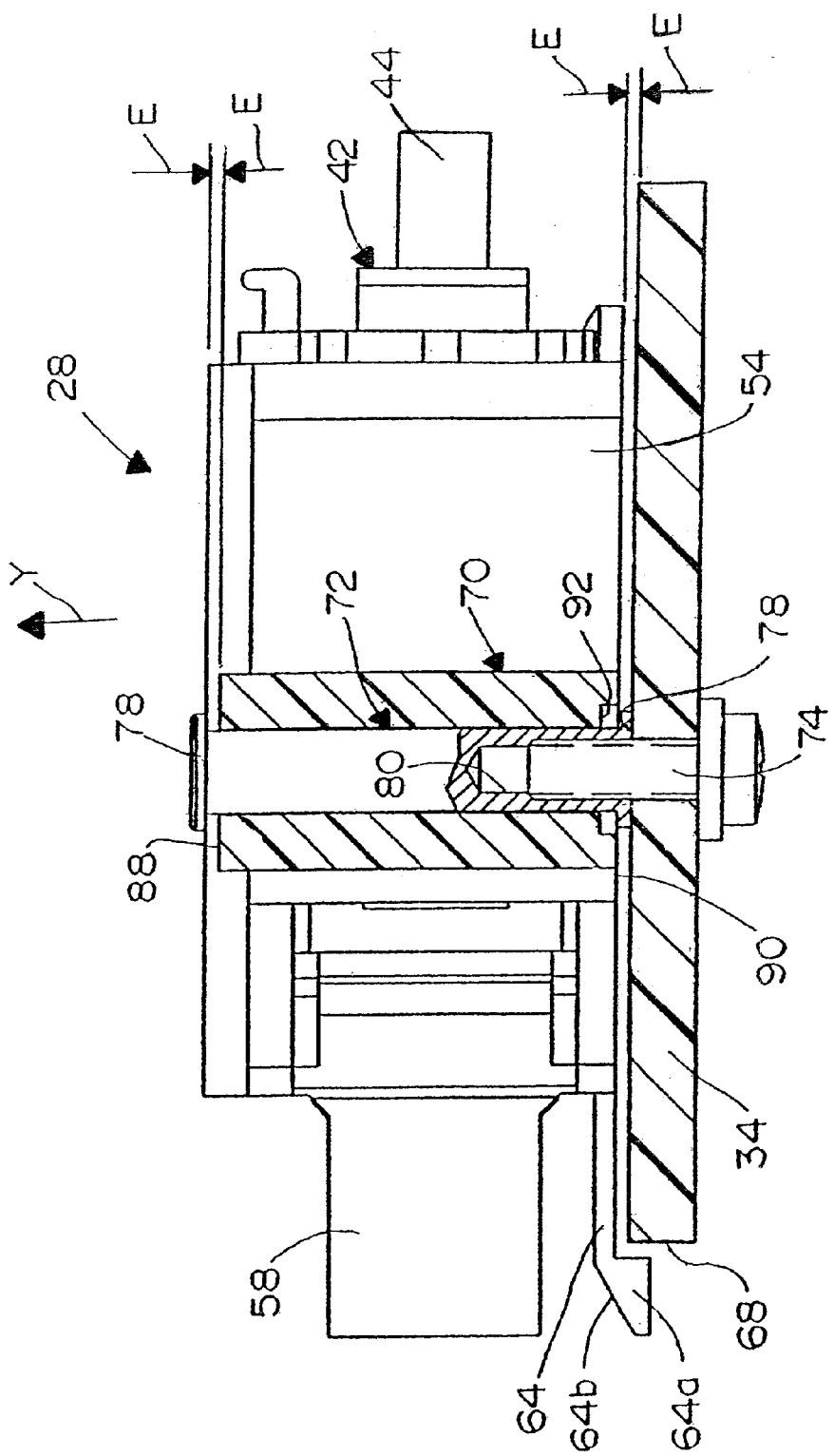
FIG. 7 is a side elevational view of the daughterboard connector assembly, partially broken away and in section to show the amount of floating movement between the connector assembly and the substrate in a direction generally perpendicular to the substrate.
Figure 8:
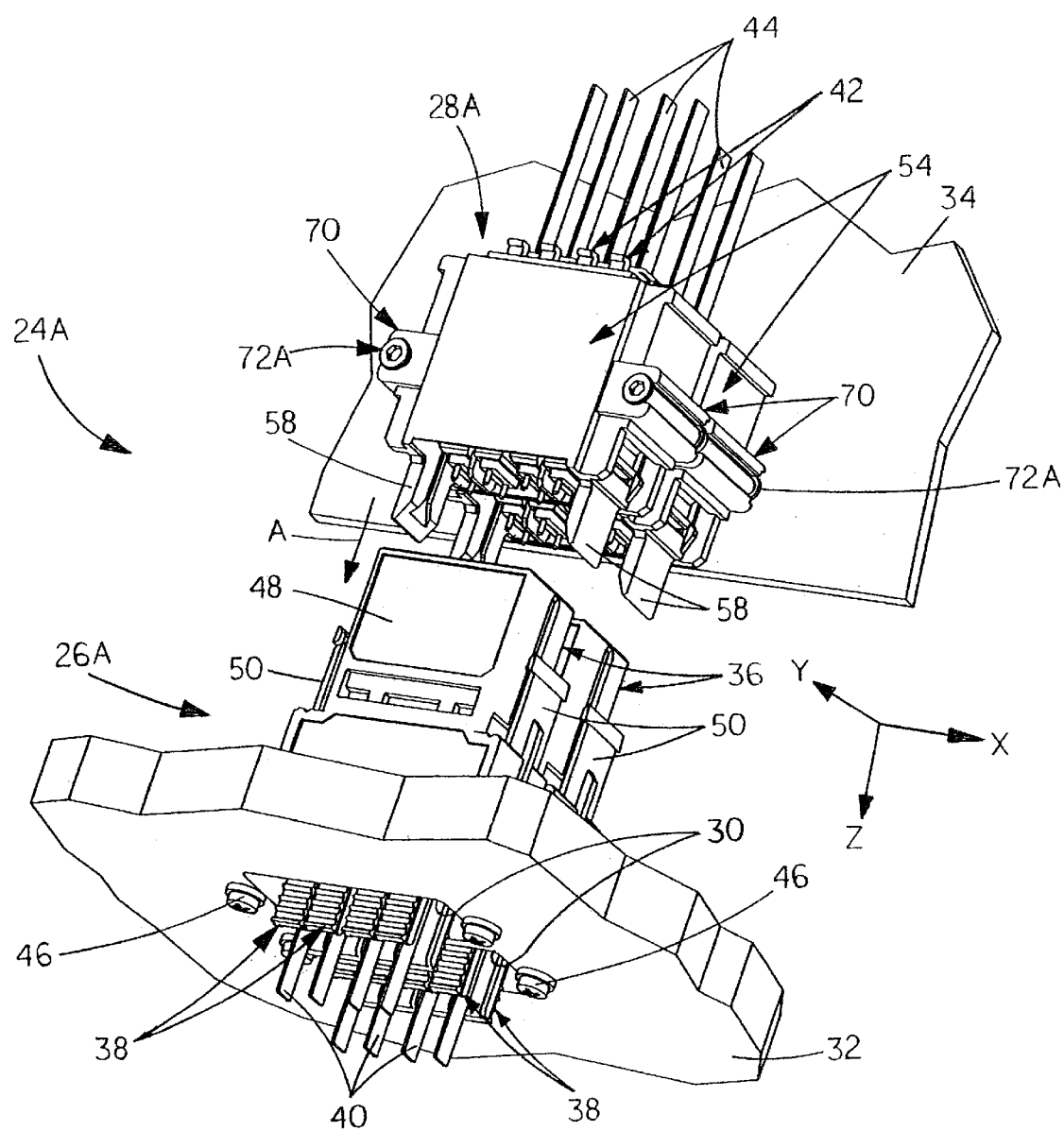
FIG. 8 is a view similar to that of FIG. 1, but of a second embodiment of the invention.
Figure 9:
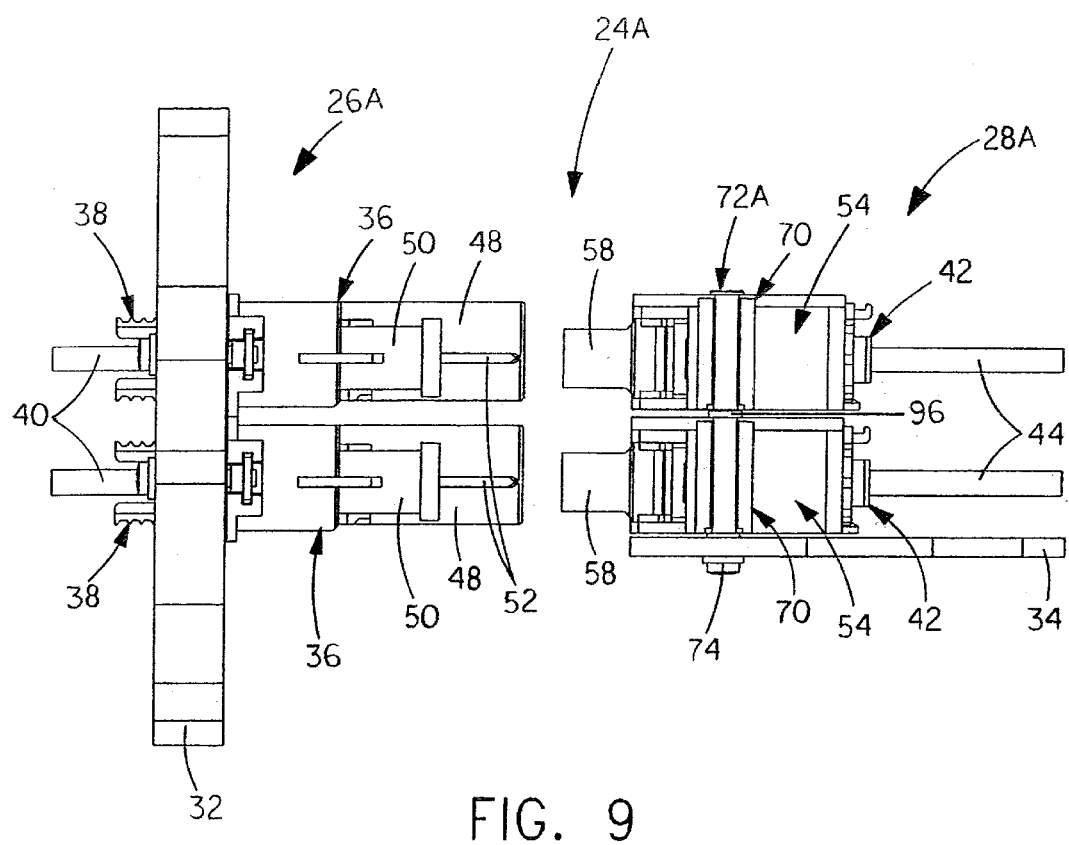
FIG. 9 is a view similar to that of FIG. 2, but of the second embodiment.
Figure 10:
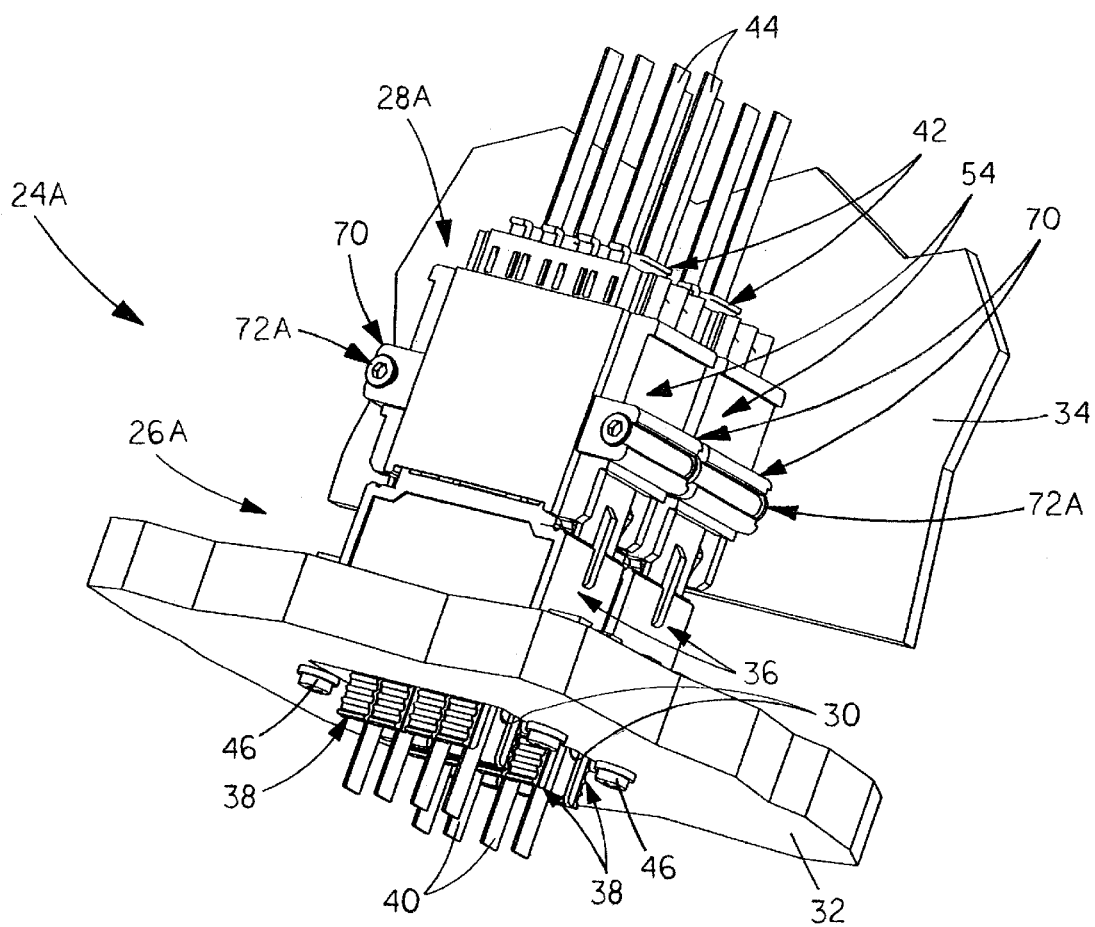
FIG. 10 is a view similar to that of FIG. 3, but of the second embodiment.

Generally, FIG. 7 shows the amount of floating action between connector housing 54 and daughterboard connector assembly 18 relative to daughterboard 34 in a direction generally perpendicular to the daughterboard. More particularly, it can be seen that each fastening post 72 is longer than its respective channel 70. Each channel has top and bottom ends 88 and 90, respectively. Each fastening post 72 has enlarged heads 78 as described above. These heads abut opposite ends of the respective channel. However, it can be seen in FIG. 7 that bottom end 90 of the channel is recessed, as at 92, to accommodate the bottom head 78 of the fastening post so that the connector housing can move flush downwardly onto the top of the daughterboard rather than constantly engaging the relatively small head of the fastening bolt. In any event, the length of the fastening bolt, between enlarged heads 78, is longer than the effective length of the post-receiving channel so that floating movement of connector housing 54 and daughterboard connector assembly 28 relative to daughterboard 34 is provided as indicated by arrows "E". This floating movement is in the "Y" direction described above, i.e., generally perpendicular to daughterboard 34 and generally perpendicular to the mating direction of the connector assemblies as indicated by both arrows "A" and "Z".

FIGS. 8–13 show a second embodiment of the invention wherein a mating connector assembly, generally designated 24A, includes a backplane connector assembly, generally designated 26A, mateable with a daughterboard connector assembly, generally designated 28A. Backplane connector assembly 26A includes a pair of adapters 36 one on top of another and mounted in a pair of apertures 30 motherboard 32. Daughterboard connector assembly 28A includes a pair of connector housings 54 stacked one on top of the other on top of daughterboard 34. Otherwise, connector assemblies 26A and 28A are the same as connector assemblies 26 and 28 described above in relation to FIGS. 1–7. Consequently, like reference numerals have been applied in FIGS. 8–13 to refer to like components described above in relation to the first embodiment of FIGS. 1–7. The descriptions and functions of those components will not be repeated in order to avoid unnecessarily expanding the specification.

The major difference between the second embodiment of FIGS. 8–13 and the first embodiment of FIGS. 1–7 is that a single elongated fastening post, generally designated 72A, is snap-fit in each pair of vertically aligned channels 70 of the pair of connecting housings 54 of daughterboard connector assembly 28A. The pair of elongated fastening posts 72A perform the dual function of mounting the connector housings on daughterboard 34 as well as stacking the housings one on top of another, and in a spaced relationship.

Figure 11:
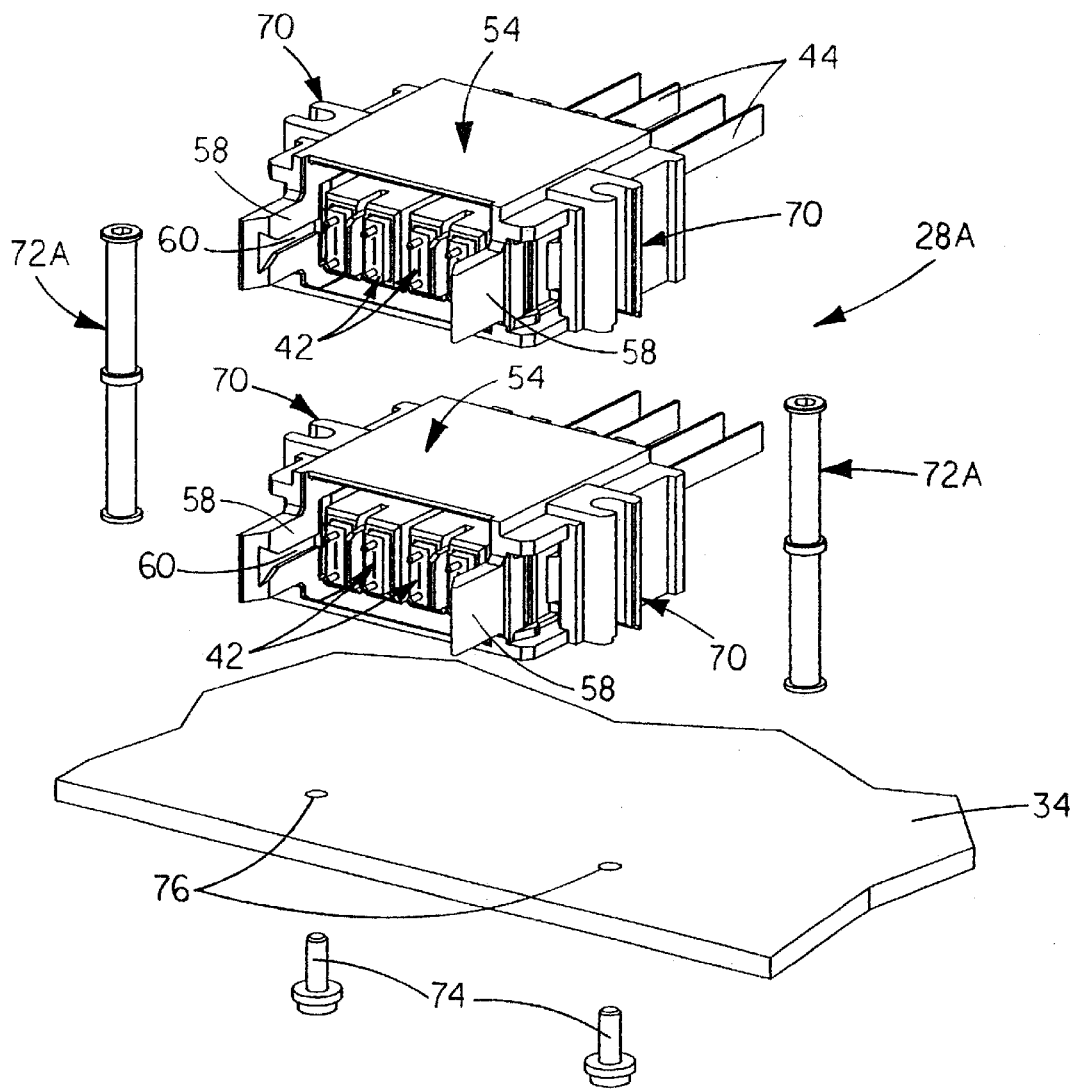
FIG. 11 is a view similar to that of FIG. 4, but of the second embodiment.
Figure 12A:
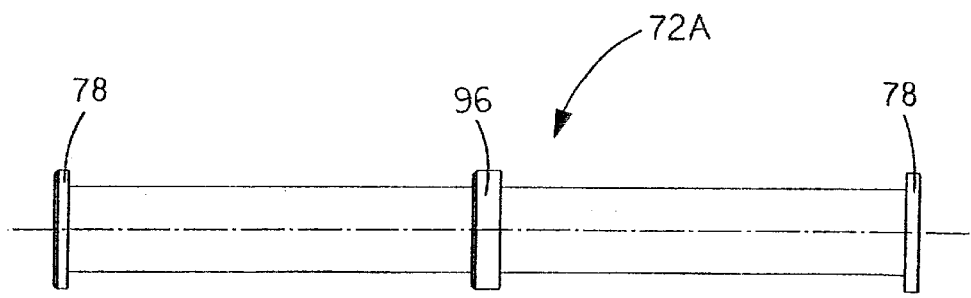
FIGS. 12A–12C are views similar to FIGS. 5A–5C, respectively, but of the second embodiment.
Figure 12B:
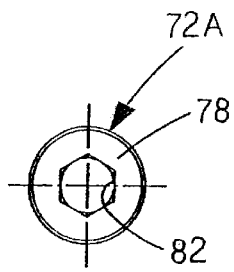
Figure 12C:
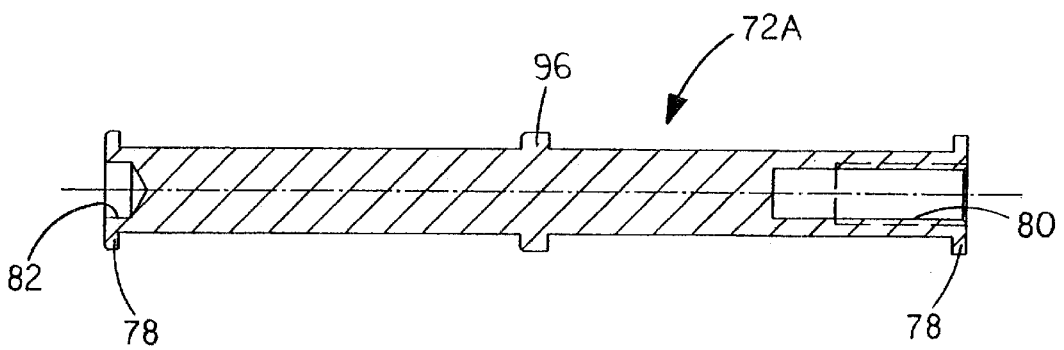
Figure 13:
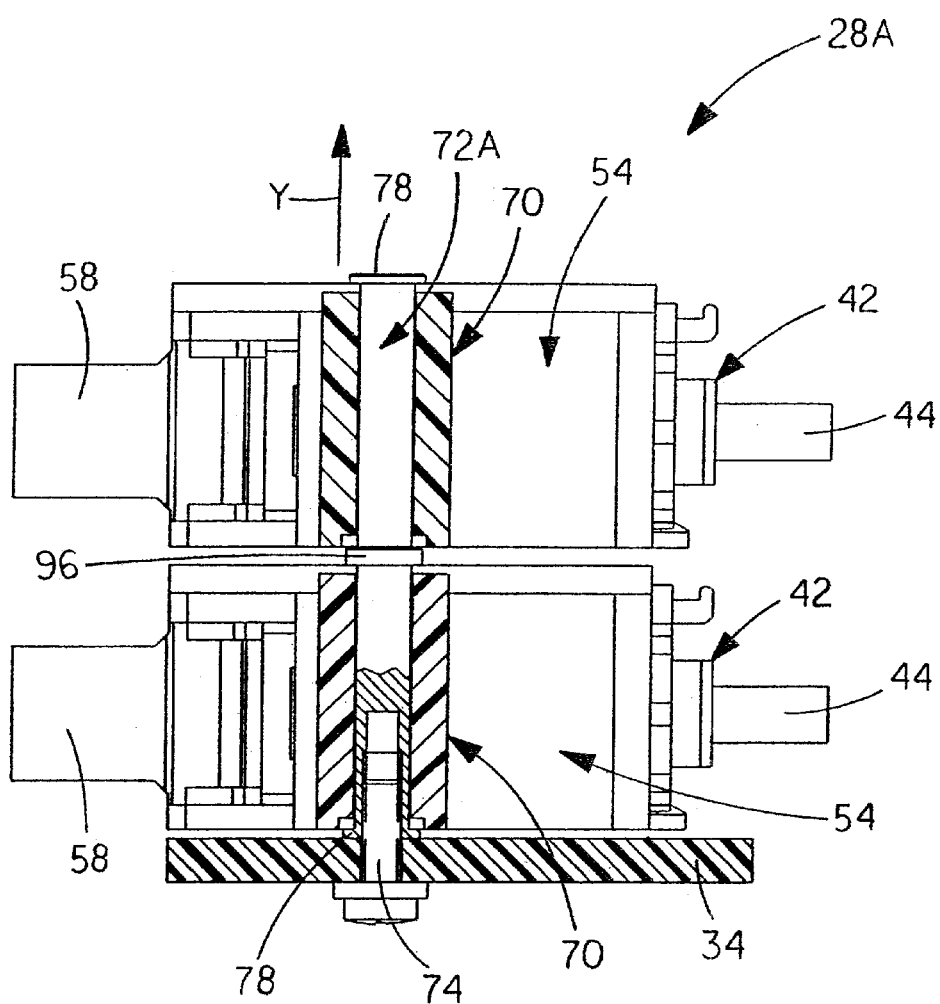
FIG. 13 is a view similar to that of FIG. 7, but of the second embodiment.

Elongated fastening posts 72A of the second embodiment are best shown in FIGS. 11–13. Like fastening posts 72 of the first embodiment, each fastening post 72A of the second embodiment is elongated, generally cylindrical and includes a pair of enlarged heads 78 at opposite ends thereof. The bottom of each fastening post is internally threaded, as at 80, for receiving a respective one of the bolts 74 to tighten the fastening posts onto the top of daughterboard 34. The top of each fastening post includes the hexagonal socket 82 for receiving a wrench to prevent rotation of the fastening post while the bolt is threaded thereinto or to disassemble the assembly from the daughterboard if necessary. Other than the fact that fastening posts 72A are longer than fastening posts 72 to accommodate the pair of stacked connector housings, each fastening post 72A of the second embodiment includes a ring-like peripheral flange 96 projecting outwardly of the post generally equidistant between opposite ends of the post. As best seen in FIG. 13, flange 96 functions as a spacer to vertically space the pair of connector housings 54 from each other above daughterboard 34.

Like the first embodiment, fastening posts 72A of the second embodiment are dimensioned relative to channels 77 to provide for floating movement in the "X", "Y" and "Z" directions. In addition, both connector housings 54, with or without modules 42, can be assembled to a pair of fastening posts 72A to comprise a subassembly for manipulation and handling.

FIGS. 14 and 15 show a third embodiment of the invention which, like the second embodiment of FIGS. 8–13, a daughterboard connector assembly 28B is structured for stacking a pair of connector housings 54 one on top of another on top of daughterboard 34. Again, like reference numerals have been applied in FIGS. 14 and 15 to refer to like components described above in relation to the first and second embodiments of FIGS. 1–13. In addition, the respective descriptions of the structure and function of the components will not be repeated.

In the third embodiment of FIGS. 14 and 15, a pair of the elongated fastening posts 72 of the first embodiment are snap-fit into channels 70 of each connector housing 54 to provide a pair of subsassemblies for handling and manipulation and to provide for floating movement of the connector housings relative to daughterboard 34 in the "X", "Y" and "Z" directions. The bottom-most connector housing is connected to the daughterboard the same as described above in relation to the first embodiment of FIGS. 1–7.

However, FIG. 15 best shows the configuration of a bridging bracket, generally designated 98, which mounts the top-most connector housing spaced above the bottom housing. The bridging bracket is configured in an inverted, generally U-shape, including a pair of depending leg portions 98a joined by a bridge portion 98b. A flange 98c projects outwardly from the bottom of each leg portion and includes a pair of holes 100 for receiving a pair of bolt-like fasteners 102 projecting upwardly from daughterboard 34. Holes 100 may be internally threaded for receiving externally threaded fasteners 102. A pair of externally threaded fasteners 74 extend upwardly through bridge portion 98b of bracket 98 for threading into fastening posts 72 of the top-most connector housing 54.

In assembling daughterboard connector assembly 28B, the bottom-most connector housing 54 is assembled to daughterboard 34 as shown in FIG. 15 the same as with the first embodiment of FIGS. 1–7. Bridging bracket 98 then is assembled to the daughterboard by using fasteners 102. The top connector housing 54 then is mounted on top of the bridging bracket. In an alternative assembly procedure, bridging bracket 98 could be assembled to the top connector housing by using fasteners 74 through bridge portion 98b of the bracket before mounting to daughterboard 34. The bracket and the top connector housing, thereby, can comprise an additional subassembly to facilitate handling and manipulation and to more easily thread fasteners 74 from within the bridging bracket.

In either the second embodiment of FIGS. 8–13 or the third embodiment of FIGS. 14 and 15, it can be seen that high density interconnections can be made on daughterboard 34 without using up additional space or "real estate" on the daughterboard or substrate. With the second embodiment of FIGS. 8–13, two or more connector housings can be stacked on top of each other, using the same amount of space on daughterboard 34 as a single connector housing. The connectors are spaced from each other and can work independently to increase the connection density without increasing the space on the subjacent substrate or daughterboard.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

We claim:

1. A system for mounting a connecting device to a substrate with relative floating movement therebetween, comprising:
   at least a pair of connector housings stacked on the substrate one on top of another, each housing including at least one elongated channel in a side of the housing, the channel extending generally perpendicular to the substrate and having an elongated restricted mouth opening at a side thereof;
   an elongated fastening post long enough to be snap-fit into said channels in both housings past the restricted mouths thereof to a preload position, a cross-dimension of the channels being larger than a cross-dimension of the fastening post so that the post can float relative to the housings, the elongated fastening post including means for spacing the housings from each other; and
   a fastener engaged with the substrate and operatively associated with the fastening post for tightening the post against the substrate, leaving the connector housings with floating movement relative to the substrate in a direction generally parallel to the substrate.

2. A system for mounting a connecting device to a substrate with relative floating movement therebetween, comprising:
   at least a pair of connector housings stacked on the substrate one on top of another, each housing including at least one elongated channel in a side of the housing, the channel extending generally perpendicular to the substrate and having an elongated restricted mouth opening at a side thereof;
   a first fastening post snap-fit into the channel in a bottom-most connector housing adjacent the substrate past the restricted mouth of the housing to a preload position, a cross-dimension of the channel being larger than a cross-dimension of the first fastening post so that the post can float relative to the housing;
   a first fastener engaged with the substrate and operatively associated with the first fastening post for tightening the post against the substrate, leaving the bottom-most connector housing with floating movement relative to the substrate in a direction generally parallel to the substrate;
   a bridging bracket secured to the substrate and extending over the bottom-most connector housing;
   a second elongated fastening post secured to the bridging bracket and snap-fit into the channel in a top-most connector housing above the bridging bracket past the restricted mouth of the top-most housing to a preload position, a cross-dimension of the channel being larger than a cross-dimension of the second fastening post so that the post can float relative to the top-most housing; and
   a second fastener engaged with the bridging bracket and operatively associated with the second fastening post for tightening the post against the bracket, leaving the top-most connector housing with floating movement relative to the substrate in a direction generally parallel to the substrate.

3. A system for mounting a connecting device to a substrate with relative floating movement therebetween, comprising:
   at least a pair of connector housings stacked on the substrate one on top of another, each housing including at least one elongated channel in a side of the housing, the channel extending generally perpendicular to the substrate;
   an elongated fastening post mounted in the channels of the stacked housings, the post being longer than the channels, and the post including means for spacing the housings from each other; and
   a fastener engaged with the substrate and operatively associated with the fastening post for tightening the post against the substrate, leaving the connector housings with floating movement relative to the substrate in a direction generally perpendicular to the substrate.

4. A system for mounting a connecting device to a substrate with relative floating movement therebetween, comprising:
   at least a pair of connector housings stacked on the substrate one on top of another, each housing including at least one elongated channel in a side of the housing, the channel extending generally perpendicular to the substrate;
   a first elongated fastening post mounted in the channel of a bottom-most connector housing adjacent the substrate, the post being longer than the channel;
   a first fastener engaged with the substrate and operatively associated with the first fastening post for tightening the post against the substrate, leaving the bottom-most connector housing with floating movement relative to the substrate in a direction generally perpendicular to the substrate;

a bridging bracket secured to the substrate and extending over the bottom-most connector housing;

a second elongated fastening post secured to the bridging bracket and mounted in the channel of a top-most connector housing above the bridging bracket; and a second fastener engaged with the bridging bracket and operatively associated with the second fastening post for tightening the post against the bracket, leaving the top-most connector housing with floating movement relative to the substrate in a direction generally perpendicular to the substrate.

5. A system for mounting a connecting device to a substrate with relative floating movement therebetween, comprising:

at least a pair of connector housings stacked on the substrate one on top of another, each housing including at least one elongated channel in a side of the housing, the channel extending generally perpendicular to the substrate;

an elongated fastening post mounted in the channels of the stacked housings, a cross-dimension of the channels being larger than a cross-dimension of the fastening post so that the post can float relative to the housings, and the post including means for spacing the housings from each other; and a fastener engaged with the substrate and operatively associated with the fastening post for tightening the post against the substrate, leaving the connector housings with floating movement relative to the substrate in a direction generally parallel to the substrate.

6. A system for mounting a connecting device to a substrate with relative floating movement therebetween, comprising:

at least a pair of connector housings stacked on the substrate one on top of another, each housing including at least one elongated channel in a side of the housing, the channel extending generally perpendicular to the substrate;

a first elongated fastening post mounted in the channel in a bottom-most connector housing adjacent the substrate, a cross-dimension of the channel being larger than a cross-dimension of the first fastening post so that the post can float relative to the bottom-most housing;

a first fastener engaged with the substrate and operatively associated with the first fastening post for tightening the post against the substrate, leaving the bottom-most connector housing with floating movement relative to the substrate in a direction generally parallel to the substrate;

a bridging bracket secured to the substrate and extending over the bottom-most connector housing;

a second elongated fastening post mounted in the channel in a top-most connector housing above the bridging bracket, a cross-dimension of the channel in the top-most connector housing being larger than a cross-dimension of the second fastening post so that the post can float relative to the top-most housing; and a second fastener engaged with the bridging bracket and operatively associated with the second fastening post for tightening the post against the bridging bracket, leaving the top-most connector housing with floating movement relative to the bracket in a direction generally parallel to the bracket.

7. A system for mounting a connecting device to a substrate with relative floating movement therebetween, comprising:

at least a pair of connector housings stacked on the substrate one on top of another, each housing including at least one elongated channel in a side of the housing, the channel extending generally perpendicular to the substrate and having an elongated restricted mouth opening at a side thereof;

an elongated fastening post long enough to be snap-fit into the channels of the housings past the restricted mouths thereof to a preload position whereby the housings and the fastening post comprise a subassembly for manipulation and handling, the fastening post including means for spacing the housings from each other; and a fastener engaged with the substrate and operatively associated with the fastening post for tightening the post against the substrate.

8. A system for mounting a connecting device to a substrate, comprising:

at least a pair of connector housings stacked on the substrate one on top of another, each housing including at least one elongated channel in a side of the housing, the channels extending generally perpendicular to the substrate;

a first fastening post mounted in the channel in a bottom-most connector housing adjacent the substrate;

a first fastener engaged with the substrate and operatively associated with the fastening post for tightening the post against the substrate;

a bridging bracket secured to the substrate and extending over the bottom-most connector housing;

a second elongated fastening post mounted in the channel in a top-most connector housing above the bridging bracket; and a second fastener engaged with the bridging bracket and operatively associated with the second fastening post for tightening the post against the bridging bracket.

* * * * *